United States Patent
Zou et al.

(10) Patent No.: US 10,552,973 B2
(45) Date of Patent: Feb. 4, 2020

(54) IMAGE VISION PROCESSING METHOD, DEVICE AND EQUIPMENT

(71) Applicant: SAMSUNG ELECTRONICS CO., LTD., Suwon-si (KR)

(72) Inventors: Dongqing Zou, Beijing (CN); Feng Shi, Beijing (CN); Weiheng Liu, Beijing (CN); Deheng Qian, Beijing (CN); Hyunsurk Eric Ryu, Hwaseong-si (KR); Jia Li, Beijing (CN); Jingtao Xu, Beijing (CN); Keun Joo Park, Seoul (KR); Qiang Wang, Beijing (CN); Changwoo Shin, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 77 days.

(21) Appl. No.: 15/812,554

(22) Filed: Nov. 14, 2017

(65) Prior Publication Data
US 2018/0137639 A1    May 17, 2018

(30) Foreign Application Priority Data
Nov. 14, 2016    (CN) .......................... 2016 1 1033320

(51) Int. Cl.
*G06K 9/00* (2006.01)
*G06T 7/593* (2017.01)
*H04N 13/128* (2018.01)

(52) U.S. Cl.
CPC .......... *G06T 7/593* (2017.01); *H04N 13/128* (2018.05); *G06T 2207/10012* (2013.01); *G06T 2207/10028* (2013.01)

(58) Field of Classification Search
None
See application file for complete search history.

(56) References Cited

U.S. PATENT DOCUMENTS 8,619,082 B1 * 12/2013 Ciurea ................. H04N 13/232
345/427
8,817,020 B2   8/2014 Limonov et al.
(Continued)

FOREIGN PATENT DOCUMENTS

JP    5342036 B2    11/2013
JP    5761522 B2    8/2015
(Continued)

OTHER PUBLICATIONS

Lee, et al., "Computation of Dense Disparity Map and Hole Filling", 2007, University of Incheon, pp. 424-427.

*Primary Examiner* — Hadi Akhavannik
(74) *Attorney, Agent, or Firm* — Sughrue Mion, PLLC

(57) ABSTRACT

Exemplary embodiments provide an image vision processing method, device and equipment and relate to: determining parallax and depth information of event pixel points in a dual-camera frame image acquired by Dynamic Vision Sensors; determining multiple neighboring event pixel points of each non-event pixel point in the dual-camera frame image; determining, according to location information of each neighboring event pixel point of each non-event pixel point, depth information of the non-event pixel point; and performing processing according to the depth information of each pixel point in the dual-camera frame image. Since non-event pixel points are not required to participate in the matching of pixel points, even if it is difficult to distinguish between the non-event pixel points or the non-event pixel points are occluded, depth information of the non-event pixel points can be accurately determined according to the location information of neighboring event pixel points.

13 Claims, 5 Drawing Sheets

(56) References Cited

U.S. PATENT DOCUMENTS

| | | | |
|---|---|---|---|
| 9,204,133 | B2 | 12/2015 | Shigemura et al. |
| 2008/0285655 | A1* | 11/2008 | Au .................... H04N 19/577 375/240.16 |
| 2012/0257018 | A1 | 10/2012 | Shigemura et al. |
| 2012/0287247 | A1 | 11/2012 | Stenger et al. |
| 2014/0055450 | A1 | 2/2014 | Limonov et al. |
| 2015/0206307 | A1 | 7/2015 | Le et al. |
| 2015/0215602 | A1 | 7/2015 | Chang et al. |
| 2015/0229915 | A1 | 8/2015 | Kirk et al. |
| 2016/0027161 | A1* | 1/2016 | Aydin .................... G06T 5/009 382/162 |
| 2016/0093273 | A1* | 3/2016 | Wang .................... G01S 3/781 345/428 |
| 2017/0223333 | A1 | 8/2017 | Zou et al. |

FOREIGN PATENT DOCUMENTS

| | | |
|---|---|---|
| JP | 5971017 B2 | 8/2016 |
| KR | 10-1207862 B1 | 12/2012 |
| KR | 10-2013-0057586 A | 6/2013 |
| KR | 10-2013-0060522 A | 6/2013 |
| KR | 10-1290197 B1 | 7/2013 |
| WO | 2016/047985 A1 | 3/2016 |

\* cited by examiner

IMAGE VISION PROCESSING METHOD, DEVICE AND EQUIPMENT

CROSS-REFERENCE TO RELATED APPLICATIONS

This application claims the benefit of Chinese Patent Application No. 201611033320.2, filed on Nov. 14, 2016, in the State Intellectual Property Office of the People's Republic of China, the disclosure of which is incorporated herein in its entirety by reference.

TECHNICAL FIELD

Exemplary embodiments consistent with the present invention relate to the technical field of image processing, and in particular to an image vision processing method, device and equipment.

BACKGROUND ART

A Dynamic Vision Sensor (DVS) is a novel Complementary Metal Oxide Semiconductor (CMOS) image sensor. Different from images generated by a conventional CMOS or Charged-coupled Device (CCD) sensor, the DVS can generate events according to the change in illumination intensity of a scene. The DVS generates a DVS image by using the change in contrast of pixel points which exceeds a preset threshold due to the change in illumination intensity, as event pixel events, and the change in contrast of pixel points which does not exceed the preset threshold, as non-event pixel points, so as to generate a DVS image.

Image vision processing methods based on a dual-camera DVS image are widely applied in the fields such as object recognition, scene 3D modeling, image rendering, stereoscopic television and aided driving.

In the existing image vision processing methods, it is generally required to acquire a dual-camera DVS frame image (i.e., a dual-camera frame image). The existing image vision processing method comprises the operations of: photographing and generating a left-camera frame image by a left-camera DVS camera, and photographing and generating a right-camera frame image by a right-camera DVS camera; and, determining the parallax between pixel points in the left-camera frame image and matched pixel points in the right-camera frame image in the dual-camera frame image, and determining depth information of the matched pixel points according to the determined parallax. Wherein, the parallax between pixel points in the left-camera frame image and the matched pixel points in the right-camera frame image is determined mainly by a frame image matching technology based on local feature similarity, non-local feature similarity or global feature similarity.

However, the DVS generates a small amount of (i.e., sparse) event pixel points and the event pixel points generated by the left and right DVS cameras are inconsistent in distribution and amount, or more. Therefore, pixel points within most regions of the left-camera frame image and right-camera frame image are non-event pixel points.

On one hand, since the non-event pixel points have a small change in contrast, and there is a little difference in contrast between the non-event pixel points particularly in a scene with a high illumination intensity (e.g., backlight) or a low illumination intensity (e.g., at night or in a dark room), it is difficult to distinguish between the non-event pixel points. Therefore, in the existing image vision processing method, when performing matching between non-event pixel points or between event pixel points and non-event pixel points in the left-camera and right-camera frame images, it is very likely to result in mismatching. On the other hand, when there is a repetitive texture structure (e.g., checkerboard texture) in a frame image, due to the repetition of the texture, a non-event pixel point in a camera frame image have a plurality of matchable pixel points in the other camera frame image, so that it is very likely to result in mismatching. Undoubtedly, the depth information determined according to the mismatched non-event pixel points is wrong, and the non-event pixel points are very likely to become noise points. As a result, the accuracy of the depth information of pixel points in the whole frame image is reduced greatly. Consequently, subsequent processing operations based on the depth information of pixel points in the frame image are adversely impacted, or even the subsequent processing operations based on the depth information of the pixel points fails.

In addition, in the existing image vision processing methods, the parallax and depth information of the matched pixel points can be calculated only after the pixel points in the dual-camera frame images are matched. However, due to the occlusion by different objects to be shot in some scenes (e.g., close shooting or macro shooting), the dual-camera frame images are not completely consistent. That is, some non-event pixel points in a camera frame image do not have matchable pixel points in the other camera frame image. Therefore, in the existing image vision processing methods, the depth information of these unmatchable non-event pixel points cannot be determined, and these non-event pixel points are very likely to become noise points. As a result, the accuracy of the depth information of pixel points in the whole frame image is reduced greatly. Consequently, subsequent processing operations based on the depth information of pixel points in the frame image are adversely impacted, or even the processing operations based on the depth information of the pixel points fails.

SUMMARY

In view of the deficiencies in the related art, the present exemplary embodiments provide an image vision processing method, device and equipment in order to address the challenges regarding low accuracy of depth information of non-event pixel points in the related art and improve the accuracy of depth information of non-event pixel points.

According to the first aspect, exemplary embodiments provide an image vision processing method, including the operations of: determining parallax and depth information of each event pixel point in a dual-camera frame image acquired by Dynamic Vision Sensors (DVSs); determining multiple neighboring event pixel points of each non-event pixel point in the dual-camera frame image; determining, according to location information of each neighboring event pixel point of each non-event pixel point, depth information of this non-event pixel point; and performing processing according to the depth information of each pixel point in the dual-camera frame image.

According to the second aspect, the exemplary embodiments further provide an image vision processing device, including: an event pixel point depth determination module configured to determine parallax and depth information of each event pixel point in a dual-camera frame image acquired by DVSs; a neighboring event pixel point determination module configured to determine multiple neighboring event pixel points of each non-event pixel point in the dual-camera frame image; a non-event pixel point depth determination module configured to determine, according to location information of each neighboring event pixel point of each non-event pixel point, depth information of this non-event pixel point; and a pixel-depth-based processing module configured to perform processing according to the depth information of each pixel point in the dual-camera frame image.

According to the third aspect, the exemplary embodiments further provide an image vision processing equipment, including: Dynamic Vision Sensor (DVS) cameras configured to acquire a dual-camera frame image by photographing; and the image vision processing device according to the second aspect of the exemplary embodiments, configured to perform vision processing on the dual-camera frame image to obtain depth information of each pixel point in the dual-camera frame image, and perform processing.

In another aspect, there is an image vision processing method including: determining parallax information and depth information of event pixel points of a plurality of pixel points in a dual-camera frame image acquired by Dynamic Vision Sensors (DVSs), the plurality of pixel points including the event pixel points and non-event pixel points; determining a plurality of multiple neighboring event pixel points of the non-event pixel points in the dual-camera frame image acquired by DVSs; determining depth information of the non-event pixel points, according to location information of the plurality of multiple neighboring event pixel points of the non-event pixel points; and performing processing according to the depth information of the non-event pixel points in the dual-camera frame image acquired by DVSs.

In another exemplary embodiment, there is an image vision processing device including: at least one processor configured to implement: an event pixel point depth determination module configured to determine parallax information and depth information of event pixel points in a dual-camera frame image acquired by DVSs; a neighboring event pixel point determination module configured to determine multiple neighboring event pixel points of non-event pixel points in the dual-camera frame image acquired by DVSs; a non-event pixel point depth determination module configured to determine, according to location information of the multiple neighboring event pixel points, depth information of the non-event pixel points; and a pixel-depth-based processing module configured to perform processing according to the depth information of pixel points in the dual-camera frame image acquired by DVSs.

In yet another exemplary embodiment, there is an image vision processing equipment including: Dynamic Vision Sensor (DVS) cameras configured to acquire the dual-camera frame image by photographing; and the image vision processing device according to claim 11, configured to perform vision processing on the dual-camera frame image to obtain the depth information of the pixel points in the dual-camera frame image, and perform processing.

In the exemplary embodiments, the depth information of non-event pixel points occupying most regions of a frame image is determined according to the location information of multiple neighboring event pixel points. Since the non-event pixel points do not participate in the matching of pixel points, the problem in the related art that non-event pixel points are likely to be mismatched or unable to be matched is completely avoided. Even if it is difficult to distinguish between the non-event pixel points in terms of illumination intensity, contrast and texture or the non-event pixel points are occluded, in the exemplary embodiments, the depth information of the non-event pixel points can be accurately determined according to the location information of neighboring event pixel points, so that the accuracy of the depth information of the non-event pixel points occupying most regions of the frame image is improved. Consequently, the accuracy of the depth information of pixel points in the frame image is improved as a whole, and it is convenient to perform subsequent operations based on the depth information of the pixel points in the frame image. Moreover, in the exemplary embodiments, the operations of calculating the parallax of the non-event pixel points are omitted, so that the efficiency is improved.

Additional aspects and features of the present invention will be partially appreciated and become apparent from the description below, or will be well learned from the practices of the exemplary embodiments.

THE DESCRIPTION OF DRAWINGS

The above and/or additional aspects and features of the exemplary embodiments will become apparent and be more readily appreciated from the following descriptions, with reference to the accompanying drawings, in which.

DETAILED DESCRIPTION OF THE EXEMPLARY EMBODIMENTS

Figure 1:
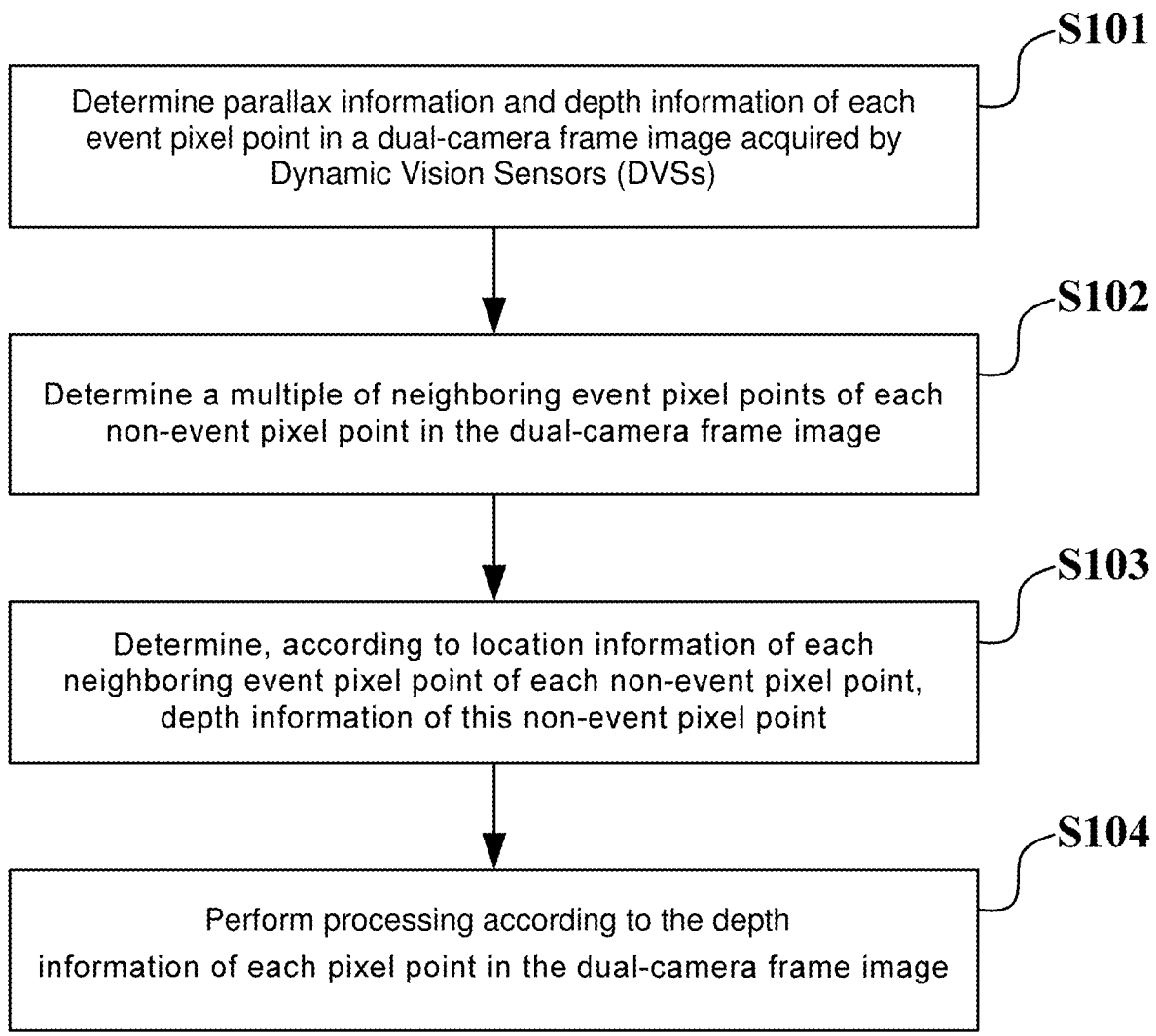
FIG. 1 is a schematic flowchart of an image vision processing method according to exemplary embodiments.

Exemplary embodiments will be described in detail hereinafter. The examples of these exemplary embodiments have been illustrated in the accompanying drawings throughout which same or similar reference numerals refer to same or similar elements or elements having same or similar functions. The embodiments described with reference to the accompanying drawings are illustrative, merely used for explaining the present invention and should not be regarded as any limitations thereto.

It should be understood by one person of ordinary skill in the art that singular forms "a", "an", "the", and "said" may be intended to include plural forms as well, unless otherwise stated. It should be further understood that terms "comprise/comprising" used in this specification specify the presence of the stated features, integers, steps, operations, elements and/or components, but not exclusive of the presence or addition of one or more other features, integers, steps, operations, elements, components, and/or combinations thereof. It should be understood that, when a component is referred to as being "connected to" or "coupled to" another component, it can be directly connected or coupled to other elements or provided with intervening elements therebetween. In addition, "connected to" or "coupled to" as used herein can comprise wireless connection or coupling. As used herein, the term "and/or" comprises all or any of one or more associated listed items or combinations thereof.

It should be understood by one person of ordinary skill in the art that, unless otherwise defined, all terms (including technical and scientific terms) used herein have the same meaning as commonly understood by one person of ordinary skill in the art to which the present invention belongs. It should be further understood that terms, such as those defined in commonly used dictionaries, should be interpreted as having a meaning that is consistent with their meanings in the context of the related art and will not be interpreted in an idealized or overly formal sense unless expressly so defined herein.

It should be understood by one person of ordinary skill in the art that the term "terminal" and "terminal equipment" as used herein comprises not only devices with a wireless signal receiver having no emission capability but also devices with receiving and emitting hardware capable of carrying out bidirectional communication over a bidirectional communication link. Such devices can comprise cellular or other communication devices with a single-line display or multi-line display or without a multi-line display; Personal Communication Systems (PCSs) with combined functionalities of speech, data processing, facsimile and/or data communication; Personal Digital Assistants (PDAs), which may include Radio Frequency (RF) receivers, pagers, internet networks/intranet accesses, web browsers, notepads, calendars and/or Global Positioning System (GPS) receivers; and/or conventional laptop and/or palmtop computers or other devices having and/or including a RF receiver. The "terminal" and "terminal equipment" as used herein can be portable, transportable, mountable in transportations (air, sea and/or land transportations), or suitable and/or configured to run locally and/or distributed in other places in the earth and/or space for running. The "terminal" or "terminal equipment" as used herein may be a communication terminal, an internet terminal, a music/video player terminal. For example, it can be a PDA, a Mobile Internet Device (MID) and/or a mobile phone with a music/video playback function, or can be equipment such as a smart TV and a set-top box, all of which may include at least one processor.

In the exemplary embodiments, parallax information and depth information of each event pixel points in a dual-camera frame image acquired by two DVSs is determined, where the event pixel point is a pixel point having an absolute value of a change in contrast exceeding a preset threshold; a plurality of multiple neighboring event pixel points of non-event pixel points in the dual-camera frame image are determined; according to location information of each neighboring event pixel point of each non-event pixel point, depth information of this non-event pixel point is determined; and, processing is performed according to the depth information of each pixel point in the dual-camera frame image as another processing. As can be seen, in the exemplary embodiments, the depth information of non-event pixel points occupying most regions of a frame image is determined according to the location information of multiple neighboring event pixel points. Since the non-event pixel points do not participate in the matching of pixel points, the problem in the related art that non-event pixel points are likely to be mismatched or unable to be matched is completely avoided. Even if it is difficult to distinguish between the non-event pixel points in terms of illumination intensity, contrast and texture, in the exemplary embodiments, the depth information of the non-event pixel points can be accurately determined according to the location information of neighboring event pixel points, so that the accuracy of the depth information of the non-event pixel points occupying most regions of the frame image is improved. Consequently, the accuracy of the depth information of pixel points of the frame image is improved as a whole, and it is convenient to perform subsequent operations based on the depth information of the pixel points of the frame image. Moreover, in the exemplary embodiments, the operations of calculating the parallax information of the non-event pixel points are omitted, so that the efficiency is improved.

The technical solutions of the exemplary embodiments will be specifically described with reference to the accompanying drawings.

An image vision processing equipment provided by the exemplary embodiments includes Dynamic Vision Sensor (DVS) cameras and an image vision processing device.

Wherein, the DVS cameras include two cameras and Dynamic Vision Sensors (DVSs), and mainly function to perform photographing and processing to obtain a dual-camera DVS frame image. For ease of understanding, the DVS frame image is also referred to as a frame image hereinafter.

Preferably, but not necessarily, the two cameras can be arranged in the image vision processing equipment in various ways. For example, the two cameras are arranged left and right, or up and down, or along a diagonal, or in other directions.

By taking the two cameras arranged left and right as example, the DVSs can perform processing to obtain a left-camera frame image and a right-camera frame image, so as to form a dual-camera frame image.

The main functions of the image vision processing device in the exemplary embodiments include: performing vision processing on the dual-camera frame image to obtain depth information of each pixel point in the dual-camera frame image, and then performing processing. Specific details will be descried hereinafter and will not be repeated here.

The exemplary embodiments provide an image vision processing method. FIG. 1 shows a schematic flowchart of the method, comprising the following operations S101 to S104.

S101: Parallax information and depth information of each event pixel point of a plurality of pixel points in a dual-camera frame image are acquired by two DVSs.

In the exemplary embodiments, for a dual-camera frame image formed by a camera frame image and another camera frame image respectively processed by the DVSs, pixel points having an absolute value of a change in contrast exceeding a preset threshold in the dual-camera frame image are used as event pixel points, while pixel points having an absolute value of a change in contrast not exceeding the preset threshold are used as non-event pixel points.

Preferably, but not necessarily, the event pixel points are specifically manifested as white points in the frame image, and the non-event pixel point points are specifically manifested as black points in the frame image.

It has been noticed that a dual-camera frame image directly processed and generated by the DVSs include many noise points. Preferably, but not necessarily, the exemplary embodiments provide a method for reducing noise of a dual-camera frame image.

Specifically, it has been found that a frame image generated by the DVSs has a certain characteristic. Generally, the event pixel points are generated according to the change in illumination intensity. Accordingly, the event pixel points are generally distributed around the contour or boundary of a scene object and distributed regularly. Therefore, with regard to the whole frame image, the event pixel points belong to low-frequency components of the frame image. The event pixel points, which are distributed sparsely, belong to high-frequency components of the frame image and can be generally regarded as noise. Based on this characteristic, high-frequency components and low-frequency components of the frame image are obtained by Fourier transform. After the high-frequency components are removed and the original image is resumed by inverse Fourier transform, the noise can be removed.

For example, if it is assumed that I is a data of the frame image, $I_0$ is a low-frequency component of the frame image and $I_1$ is a high-frequency component of the frame image, I can be expressed as a plurality of terms of frequency after expanded, as shown by the following Equation (1):

$$I = I_0 + I_1 = \sum_{i=1}^{N/2} R_x[i]\cos(2\pi ki/N) + \sum_{i=1}^{N/2} I_x[i]\sin(2\pi ki/N) \qquad \text{(Equation 1)}$$

In the Equation (1), Rx[i] denotes a coefficient of a real part, Ix[i] denotes a coefficient of an imaginary part, and N denotes the number of terms. $2\pi ki/N$ denotes the frequency. As can be seen, if i is greater, the frequency is higher; or otherwise, the frequency is lower. Therefore, when i is greater than a preset threshold, the term of i can be regarded as a high-frequency component. If the Rx[i] and Ix[i] of the high-frequency component are set as 0, the high-frequency component of the frame image is removed.

The high-frequency coefficient and the low-frequency coefficient can be calculated by the following Equation (2) and Equation (3), respectively:

$$R_x[i] = \sum_{i=0}^{N-1} x[i]\cos(2\pi ki/N) \qquad \text{(Equation 2)}$$

$$I_x[i] = \sum_{i=0}^{N-1} x[i]\sin(2\pi ki/N) \qquad \text{(Equation 3)}$$

In Equation (2) and Equation (3), x[i] denotes a gray value of the $i^{th}$ pixel.

Figure 2:
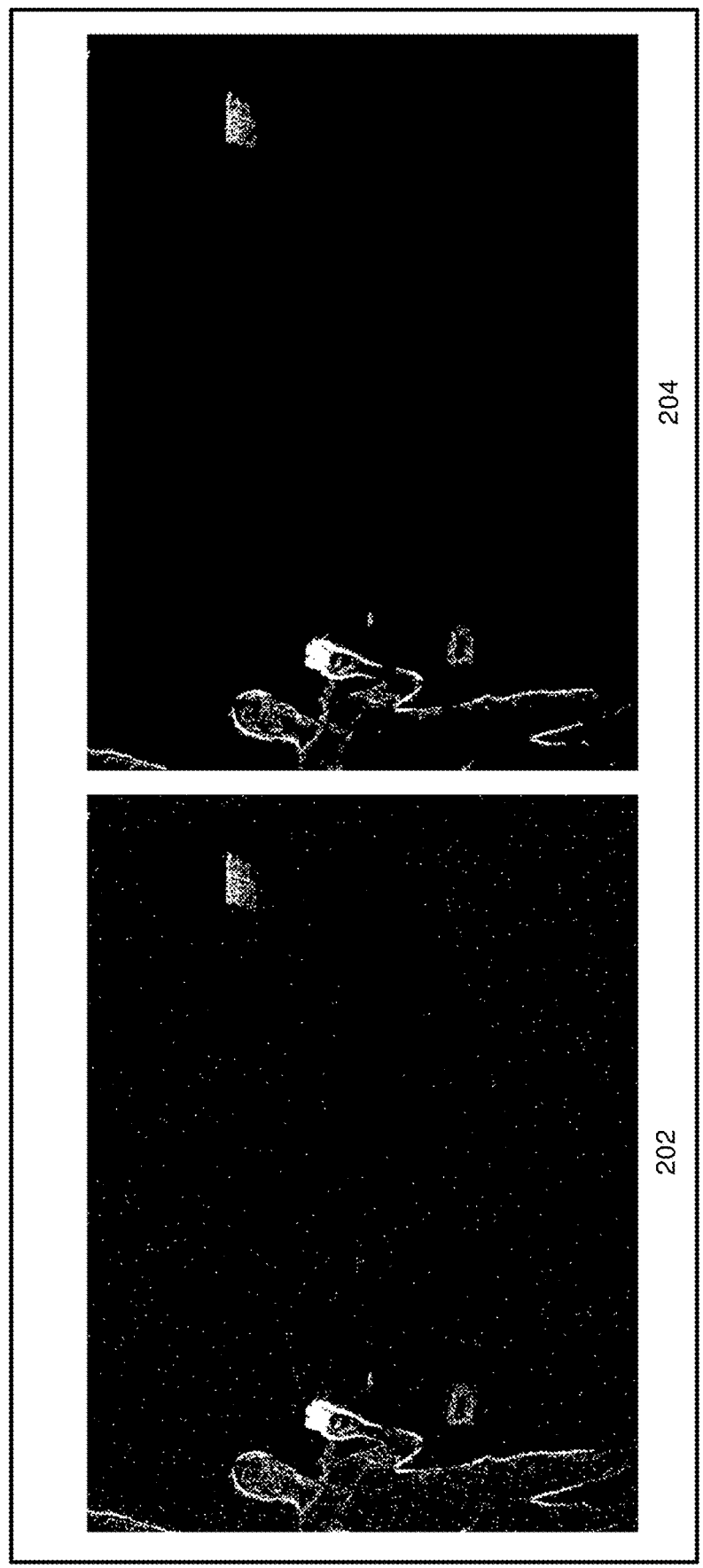
FIG. 2 is a schematic diagram of an instance of the de-noising effect of a method for reducing noise of a dual-camera frame image according to the exemplary embodiments.

FIG. 2 is a schematic diagram of an instance of the de-noising effect of a method for reducing noise of a dual-camera frame image according to the exemplary embodiments. The left image 202 on the left of FIG. 2 is a DVS frame image before noise reduction. It can be easily seen that, before noise reduction, there are a large amount of white noise points, in the frame image, within the body contour and within a large area of black background outside the body contour. The right image 204 on the right of FIG. 2 is the same DVS frame image after noise reduction. It can be easily seen that the white noise points, in the frame image, within the body contour and within a large area of black background outside the body contour are basically removed, so that the interference resulted from the noise is reduced greatly.

For a dual-camera frame image which has not experienced or has experienced noise reduction, according to each pixel point in the dual-camera frame image and an event pixel point closest thereto, a feature value of this pixel point is determined.

Specifically, for each pixel point in each camera frame image of the dual-camera frame image, an event pixel point with an increased contrast closest to this event pixel point and an event pixel point with a reduced contrast closest to this event pixel point in this camera frame image are determined.

Preferably, but not necessarily, according to event pixel points with an increased contrast and event pixel points with a reduced contrast in each camera frame image of the dual-camera frame image, positive polarity and negative polarity event images of this camera frame image are constructed, respectively, in a constructing of the polarity event images.

Event pixel points with a reduced contrast in each camera frame image are used as non-event pixel points to construct a positive polarity event image of this camera frame image. For example, all event pixel points with a reduced contrast in each camera frame image are changed to black points from white points. Non-event pixel points are still kept as black points, and all event pixel points with an increased contrast are still kept as white points. As a result, a positive polarity event image of this camera frame image showing all the event pixel points with increased contrast, is obtained.

Similarly, event pixel points with an increased contrast in each camera frame image are used as non-event pixel points to construct a negative polarity event image of this camera frame image. For example, all event pixel points with a reduced contrast in each camera frame image are still kept as white points. Non-event pixel points are still kept as black points, and all event pixel points with an increased contrast are changed to black points. As a result, a negative polarity event image of this camera frame image showing all the event pixel points with reduced contrast, is obtained.

For each pixel point in each camera frame image, event pixel points closest to each pixel point in the positive polarity and negative polarity event images of this camera frame image are determined. An Euclidean distance from the pixel point to the closest event pixel point, i.e., one first event pixel point, with an increased contrast, i.e., a first Euclidean distance, and an Euclidean distance from the pixel point to the closest event pixel point, i.e., one second event pixel point, with a reduced contrast, i.e., a second Euclidean distance, are respectively determined as a positive Euclidean distance and a negative Euclidean distance of this pixel point. Further, there is a determining other first event pixel points and other second event pixel points. For example, the other first event pixel points are closest to other pixel points.

Preferably, but not necessarily, for each pixel in each camera frame image, Euclidean distances from each pixel point to the closest event pixel points in the positive polarity and negative polarity event images are determined as positive and negative Euclidean distances of this pixel point.

For example, after each camera frame image is transformed into a positive polarity event image, the location of each pixel point in this camera frame image remains unchanged. By the Euclidean distance transform, the input DVS frame image is transformed to obtain an Euclidean distance from each pixel point in the positive polarity event image to the closest event pixel point, as shown by the following Equation (4):

$$D^P(x, y) = \min_{x'}((x - x')^2 + (y - y')^2) \qquad \text{(Equation 4)}$$

In the Equation (4), $D^p(x, y)$ denotes the Euclidean distance from the pixel point (x, y) to the closest event pixel point (x', y'), and the superscript p in $D^p(x, y)$ is the abbreviation of positive and denotes the positive polarity. Thus, the Euclidean distance from each pixel point in each camera frame image to the closest event pixel point in the positive polarity event image is obtained, and used as a positive Euclidean distance of this pixel point.

Similarly, the Euclidean distance from each pixel point in each camera frame image to the closest event pixel point in the negative polarity event image can be obtained according to the following Equation (5), and used as a negative Euclidean distance of this pixel point.

$$D^n(x, y) = \min_{x'}((x - x')^2 + (y - y')^2) \qquad \text{(Equation 5)}$$

In the Equation (5), the superscript n in $D^n(x, y)$ is the abbreviation of negative and denotes the negative polarity.

After the positive and negative Euclidean distances of each pixel point in each camera frame image are determined, the feature value of this pixel point is determined according to the positive and negative Euclidean distances of this pixel point.

Preferably, but not necessarily, the positive Euclidean distance and negative Euclidean distance of each pixel point are used as two feature elements to form the feature value of this pixel point.

After the feature value of each pixel point in the dual-camera frame image is determined, a cost matrix of this pixel point is determined according to the feature value of this pixel point.

Specifically, for one pixel point in one camera frame image of the dual-camera frame image, a plurality of other pixel points within a neighborhood with same specified axis coordinates as this pixel point in the other camera frame image are determined.

Preferably, but not necessarily, the same specified axis coordinates can be the same horizontal-axis coordinates or the same vertical-axis coordinates.

Preferably, but not necessarily, by taking left-camera and right-camera frame images as example, for one pixel point in the left (or right) camera frame image of the dual-camera frame image, a plurality of other pixel points within a neighborhood with same vertical-axis coordinates as this pixel point in the right (or left) camera frame image are determined.

According to the feature values including differences between positive Euclidean distances and differences between negative Euclidean distances of this pixel point and the plurality of other pixel points, positive and negative feature matching costs of this pixel point are determined.

For example, by taking the left-camera and right-camera frame images as example, the positive feature matching cost $CF_m^p(x, y, d)$ of each pixel point can be determined according to the following Equation (6):

$$CF_m^p(x, y, d) = \sum_{m \in W} D_m^p(x + d, y) - D_m^p(x, y) \qquad \text{(Equation 6)}$$

In the Equation (6), (x, y) denotes coordinates of a pixel point in one camera frame image, (x+d, y) denotes coordinates of another pixel point in the other camera frame image, d denotes a difference in horizontal-axis coordinates between this pixel point and the another pixel point, and W denotes a neighborhood of a pixel point having a vertical-axis coordinate y in the other camera frame image. The size of the neighborhood according to the experimental data, experiential data, historical data and/or practical situation can be determined. For example, the neighborhood can be set as a range of 3×3 pixel blocks using the pixel point having a vertical-axis coordinate y as a center. m ranges from 1 to M, where M is the number of pixel points in the neighborhood. When d changes in the ergodicity size, it is indicated that ergodicity calculation is actually performed on all pixel points in the other camera frame image within the neighborhood of the pixel point having a vertical-axis coordinate y.

Similarly, the negative feature matching cost $CF_m^n(x, y, d)$ of each pixel point can be determined according to the following Equation (7):

$$CF_m^n(x, y, d) = \sum_{m \in W} D_m^n(x + d, y) - D_m^n(x, y) \qquad \text{(Equation 7)}$$

Ergodicity calculation is performed on all pixel points within the neighborhood to obtain feature matching costs. It is advantageous to improve the anti-interference and robustness during matching of the pixel points in the exemplary embodiments.

For example, when the locations of the two cameras during shooting are bilaterally symmetrical relative to the object to be shot, other pixel points matched with one pixel point may be deviated to left or right. However, the pixel points deviated to left or right can be brought into coverage by the method for ergodicity within a neighborhood.

For another example, when the locations of the two cameras during shooting are not strictly on a same level, other pixel points matched with one pixel point may be deviated to top or bottom. However, the pixel points deviated to top or bottom can be brought into coverage by the method for ergodicity within a neighborhood.

Therefore, in the exemplary embodiments, by the method for calculating feature matching costs, it is advantageous to increase the matching accuracy of pixel points in the dual-camera frame image and thus improve the accuracy of determining the depth information of the pixel points as a whole.

For each pixel point in each frame image, a polarity matching cost of this pixel point is determined according to differences in contrast polarity between this pixel point and the plurality of other pixel points.

Specifically, the contrast polarity of each pixel point in each frame image is determined. For example, the contrast polarity of each non-event pixel point in each frame image is set as 0, the contrast polarity of an event pixel point with an increased contrast is set as 1, and the contrast polarity of an event pixel point with a reduced contrast is set as −1. Then, according to differences in contrast polarity between this pixel point and the plurality of other pixel points, a polarity matching cost of this pixel point is determined.

For example, by taking the left-camera and right-camera frame images as example, the polarity matching cost $CP(x, y, d)$ of each pixel point in each frame image can be determined according to the following Equation (8):

$$CP(x,y,d) = \|E(x+d,y) - E(x,y)\| \qquad \text{Equation (8)}$$

In the Equation (8), (x, y) denotes coordinates of one pixel point in a camera frame image, (x+d, y) denotes coordinates of another pixel point in the other camera frame image, d denotes a difference in horizontal-axis coordinates between this pixel point and the another pixel point, and E denotes the contrast polarity.

After the positive and negative feature matching costs and the polarity matching cost of each pixel point in each frame image are determined, a cost matrix of this pixel point is determined according the positive and negative feature matching costs and the polarity matching cost of this pixel point.

For example, by taking the left-camera and right-camera frame images as example, the cost matrix of each pixel point in each frame image can be determined according to the following Equation (9):

$$C(x, y, d) = \alpha \cdot \sum_{n=1}^{N} [CF_m^p(x, y, d) + CF_m^n(x, y, d)] + (1-\alpha) \cdot CP(x, y, d) \quad \text{Equation (9)}$$

In the Equation (9), a denotes the weight, which is a real number greater than 0 but less than 1.

After the cost matrix of each pixel point in each frame image is determined, i.e., determine cost matrices of pixel points, according to the cost matrix of each event pixel point (e.g., event cost matrices of event pixel points), among the cost matrixes of each pixel points, the parallax information of this event pixel point is determined, in determining parallax information.

Specifically, for each event pixel point in each camera frame image, the cost value of the cost matrix of this event pixel point is minimized to obtain the parallax information of this event pixel point based on this camera frame image.

For one of two event pixel points with same specified axis coordinates, when the parallax information of this event pixel point based on one camera frame image is equal to the parallax information of another event pixel point based on the other camera frame image, the parallax information based on one camera frame image is used as the parallax information of this event pixel point.

For example, by taking the left-camera and right-camera frame images as example, according to the cost matrix of each event pixel point, by using a greedy strategy algorithm "Winner take all", the parallax information of each event pixel point is calculated for the left-camera and right-camera frame images, respectively.

For an event pixel point (x, y) in the left-camera frame image, when the cost matrix $C^l(x, y, d)$ reaches a minimum value $$\min_{d} C^l(x, y, d),$$

d is determined as the parallax information $d_l(x, y)$ of this event pixel point in the left-camera frame image. Wherein, l is the abbreviation of left and denotes the left-camera.

Similarly, for an event pixel point (x, y) in the right-camera frame image, when the cost matrix $C^r(x, y, d)$ reaches a minimum value $$\min_{d} C^r(x, y, d),$$

d is determined as the parallax information $d_r(x, y)$ of this event pixel point in the right-camera frame image. Wherein, r is the abbreviation of right and denotes the right-camera.

Then, cross validation is performed on the parallax information of the left-camera image and the parallax information of the right-camera image according to the following Equation (10), to remove non-robust parallax information event pixel points:

$$d(x, y) = \begin{cases} d_l(x, y), \text{ if } d_l(x, y) = d_r(x+j, y) \\ -1, \text{ else} \end{cases} \quad \text{Equation (10)}$$

In the Equation (12), j in $d_r(x+j'\ y)$ denotes a difference in horizontal-axis coordinates between two pixel points when $d_l(x, y)$ is equal to $d_r(x+j, y)$; for one event pixel point (x, y) in the left-camera frame image, when the parallax information $d_r(x+j, y)$ of a pixel point having the same vertical-axis coordinate in the right-camera frame image is equal to the parallax information $d_l(x, y)$ of this event pixel point in the left-camera frame image, the parallax information of this event pixel point in the left-camera frame image is reserved; and, when the parallax information $d_r(x+j, y)$ of a pixel point having the same vertical-axis coordinate in the right-camera frame image is not equal to the parallax information $d_l(x, y)$ of this event pixel point in the left-camera frame image, the parallax information of this event pixel point in the left-camera frame image is removed in a removing operation.

According to a focal length and a spacing of DVS cameras and the parallax information of each event pixel point, depth information of this event pixel point is determined.

Specifically, according to the focal length f and the spacing B of the two cameras in the DVS cameras and the parallax information d of each event pixel point, a depth value Z=fB/d of this event pixel point is determined.

S102: Multiple neighboring event pixel points of each non-event pixel point in the dual-camera frame image are determined.

By using each non-event pixel point in one camera frame image of the dual-camera frame image as an origin of coordinates, from the close to the distant, two closest event pixel points in side directions, i.e., two side directions, of one coordinate axis are searched for in a searching operation of searching closest event pixel points, as two neighboring event pixel points of this non-event pixel point along the two side directions of the one coordinate axis.

According to the two neighboring event pixel points of each non-event pixel point along the two side directions of the one coordinate axis, a search range for neighboring event pixel points of this non-event pixel points along two side directions of another coordinate axis is determined. Wherein, the one coordinate axis is perpendicular to the another coordinate axis.

Preferably, but not necessarily, according to coordinates, e.g., first coordinates, of the two neighboring event pixel points on the one coordinate axis, a range of coordinates on the one coordinate axis of event pixel points to be searched in two side directions of another coordinate axis is determined as the search range.

Event pixel points are searched from the search range to obtain a subset of neighboring event pixel points of this non-event pixel point along the two side directions of the another coordinate axis.

Preferably, but not necessarily, closest event pixel points are searched along each side direction of the another coordinate axis from the close to the distant, respectively.

Once an event pixel point is searched, it is determined whether coordinates, e.g., second coordinates, of this event pixel point on the one coordinate axis are within the search range; if the coordinates of this event pixel point on the one coordinate axis are within the search range, this event pixel point is used as a neighboring event pixel point in this direction of the another coordinate axis, so as to obtain a subset of neighboring event pixel points of this non-event pixel point in this direction of the another coordinate axis.

Figure 3:
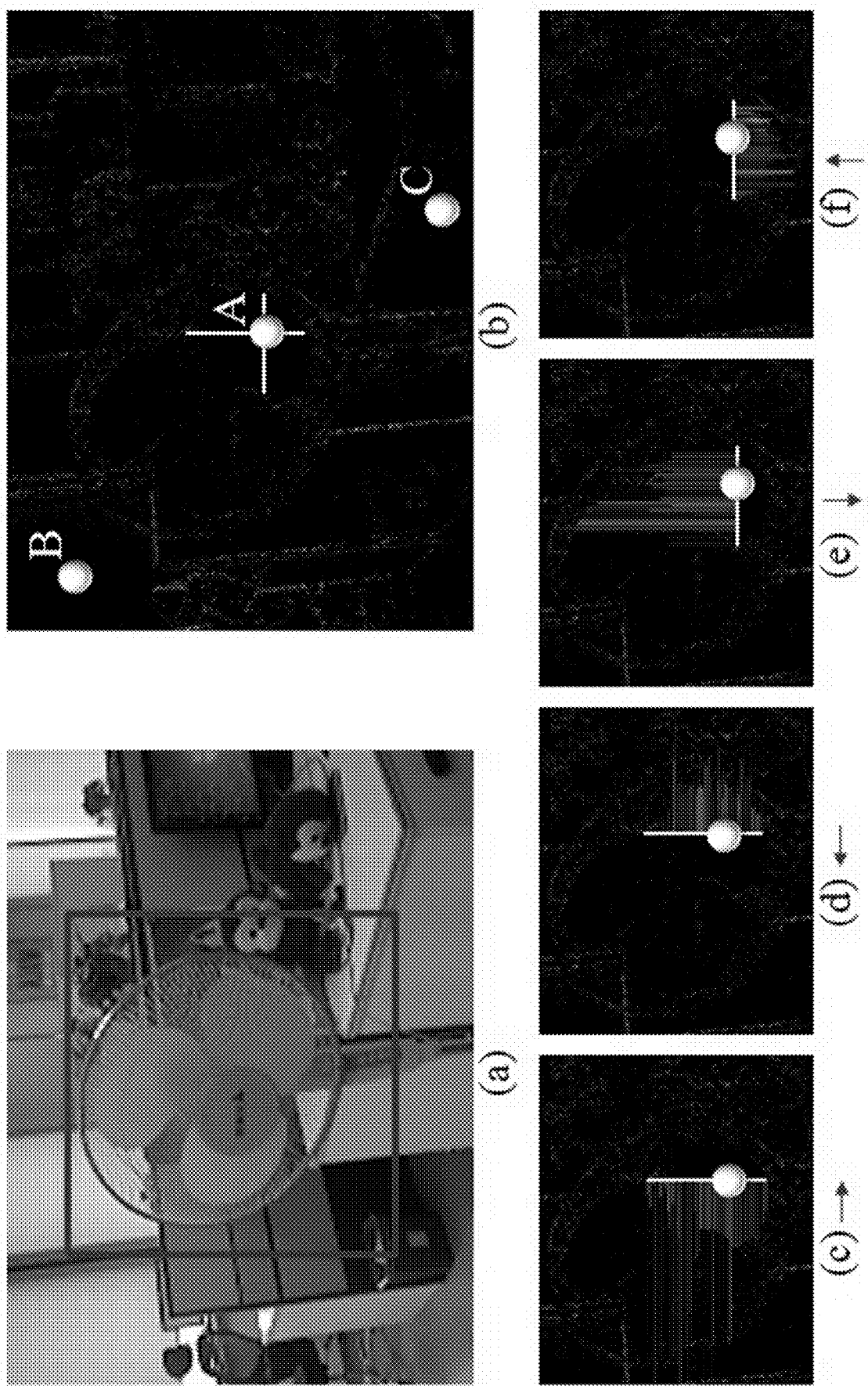
FIG. 3 is a schematic diagram of an instance of determining a subset of neighboring event pixel points of a non-event pixel point according to the exemplary embodiments.

For example, parts (a) to (f) in FIG. 3 show a process of an instance of determining a subset of neighboring event pixel points of a non-event pixel point. The part (a) in FIG. 3 shows the previewed image before DVS processing, where the image comprises a target object to be shot. Point A in the part (b) in FIG. 3 denotes a non-event pixel point in the DVS frame image, and points B and C denote event pixel points, respectively. The horizontal axis (X-axis) is the one coordinate axis, and the two side directions of the one coordinate axis is an upper side and a lower side; and, the longitudinal axis (Y-axis) is the another coordinate axis, and the two side directions of the another coordinate axis are a left side and a right side.

As shown in the part (c) in FIG. 3, by using the non-event pixel point A as an origin of coordinates, event pixel points B and C closest to the point A are searched respectively along the upper side and lower side of the horizontal axis (X-axis) as two neighboring event pixel points along the upper side and lower side of the longitudinal axis; the vertical-axis coordinates of the points B and C are separately used as an upper limit and a lower limit for vertical-axis coordinates to obtain a vertical-axis coordinate range of neighboring event pixel points to be searched in two side directions of the longitudinal axis (Y-axis) (i.e., the left side and right side of the longitudinal axis), as a search range of the left and right sides of the longitudinal axis; event pixel points closest to the point A are searched on the left side of the longitudinal axis; once an event pixel point is searched, it is determined whether the vertical-axis coordinate of this event pixel point is within the vertical-axis coordinate range (i.e., the search range); if the vertical-axis coordinate of this event pixel point is within the vertical-axis coordinate range, this event pixel point is used as a neighboring event pixel point on the left side of the longitudinal axis; and, all neighboring event pixel points of the non-event pixel point on the left side of the longitudinal axis form a subset of neighboring event pixel points of this non-event pixel point on the left side.

Further, as shown in the part (c) in FIG. 3, by using the non-event pixel point A as an origin of coordinates, event pixel points B and C closest to the point A are searched respectively along the upper side and lower side of the horizontal axis (X-axis) as two neighboring event pixel points along the upper side and lower side of the longitudinal axis; the points B and C are projected onto the longitudinal axis, respectively, to form two endpoints of a line segment containing the point A, where the line segment is a search range of event pixel points to be searched along two side directions of the longitudinal axis; event pixel points closest to the point A are searched along the left side of the longitudinal axis; once an event pixel point is searched, this event pixel point is projected onto the longitudinal axis, and it is determined whether the projection point of this event pixel point on the longitudinal axis is within the line segment range; if the projection point of this event pixel point on the longitudinal axis is within the line segment range, this event pixel point is used as a neighboring event pixel point on the left side of the longitudinal axis; and, all neighboring event pixel points of this non-event pixel point on the left side of the longitudinal axis form a subset of neighboring event pixel points of this non-event pixel point on the left side.

Similarly, as shown in the parts (d), (e) and (f) in FIG. 3, the subsets of neighboring event pixel points of the non-event pixel point on the right side, the upper side and the lower side are obtained, respectively.

According to the subset of neighboring event pixel points in each side direction of each coordinate axis, a set of neighboring event pixel points of this non-event pixel point is determined.

Preferably, but not necessarily, after the subsets of neighboring event pixel points of this non-event pixel point in each side direction of each coordinate axis are combined, repetitive neighboring event pixel points are removed to obtain a set of neighboring event pixel points of this non-event pixel point.

S103: According to location information of each neighboring event pixel point of each non-event pixel point, depth information of this non-event pixel point is determined.

For each non-event pixel point in each camera frame image, according to a sum of distances from the neighboring event pixel points in the set of neighboring event pixel points of each non-event pixel point to an assumed plane, parameters for identifying the assumed plane are determined, i.e., determining parameters.

According to the parameters for identifying the assumed plane and plane coordinates of each non-event pixel point, depth information of this non-event pixel point is determined.

Preferably, but not necessarily, according to the DVS imaging features, the event pixel points generated by the DVS depict the geometry of a scene. Therefore, non-event pixel points which do not generate events are on a same plane as part of event pixel points.

According to the discovery described above, $\{e_1^P, e_2^P, \ldots e_k^P\}$ can represent k neighboring event pixel points of a non-event pixel point P, where k is a positive integer; and, $\{G(e_1^P), \ldots, G(e_i^P), \ldots, G(e_k^P)\}$ represent three-dimensional space coordinates of the k neighboring event pixel points, and the three-dimensional space coordinates of the $i^{th}$ neighboring event pixel point is expressed as $G(e_i^P)=(X_i^P, Y_i^P, Z_i^P)$. An assumed plane is set, and an equation for this assumed plane is as follows: $f=AX+HY+OZ+P$. Wherein, all the A, H, O and P are parameters for identifying the assumed plane.

It is assumed that each neighboring event pixel point and the current non-event pixel point are on a same plane in the three-dimensional space, the parameters (A,H,O,P) of the plane equation, i.e., the parameters for identifying the assumed plane, can be solved by minimizing the following Equation (11):

$$\min \Sigma_{i=1}^{k} |AX_i^P+HY_i^P+OZ_i^P+P|(A^2+H^2+O^2)^{-1/2} \qquad \text{Equation (11)}$$

The Equation 11 shows the sum of distances from the k neighboring event pixel points to the assumed plane.

Preferably, but not necessarily, a method for solving the Equation (11) is a least square method.

Further, not all neighboring event pixel points are on the same plane as the current non-event pixel points, particularly in the occluded case. Therefore, it is necessary to select effective neighboring event pixel points on the same plane as the current non-event pixel point. Hence, this method is solved by a Random Sample Consensus (RANSAC) method.

Preferably, but not necessarily, based on the RANSAC, a subset, which is in conformity with the plane distribution and has a dispersion as small as possible, is selected from the set of neighboring event pixel points of the non-event pixel point; and, parameters for identifying the three-dimensional plane are estimated according to the selected sample subset.

After the parameters for identifying the plane are resolved by the RANSAC, X-axis and Y-axis coordinates of the current non-event pixel point are substituted into the plane equation to obtain a depth value of the current non-event pixel point.

For each non-event pixel point in each camera frame image, the process is repeated to obtain depth values of all non-event pixel points of the whole DVS image.

S104: Processing is performed according to the depth information of each pixel point in the dual-camera frame image.

The depth information of each event pixel point in each camera frame image and the depth information of the non-event pixel point determined in the above operations form the depth information of each pixel point in each camera frame image.

A pixel-level depth map of each camera frame image is determined according to the depth information of each pixel point in each camera frame image.

Median filtering is performed on the obtained pixel-level depth map to obtain a smooth pixel-level depth map.

The exemplary embodiments can be applied in various application fields such as object recognition, scene 3D modeling, image rendering, stereoscopic television and aided driving.

When the exemplary embodiments are applied in the object recognition, an object can be recognized more accurately according to the depth information of pixel points belonging to the object among the pixel points in the dual-camera frame image, so that the object is displayed more clearly.

When the exemplary embodiments are applied in the scene 3D modeling, the 3D scene can be constructed more accurately according to the depth information of each pixel point in the dual-camera frame image, so that more vivid 3D effect of this scene can be realized.

When the exemplary embodiments are applied in the aided driving, barriers such as vehicles in the front road and a distance from a surrounding object on two sides of the road to the vision processing equipment in the exemplary embodiments can be determined more accurately according to the depth information of each pixel point in the dual-camera frame image, so that it is advantageous for safe driving.

Figure 4:
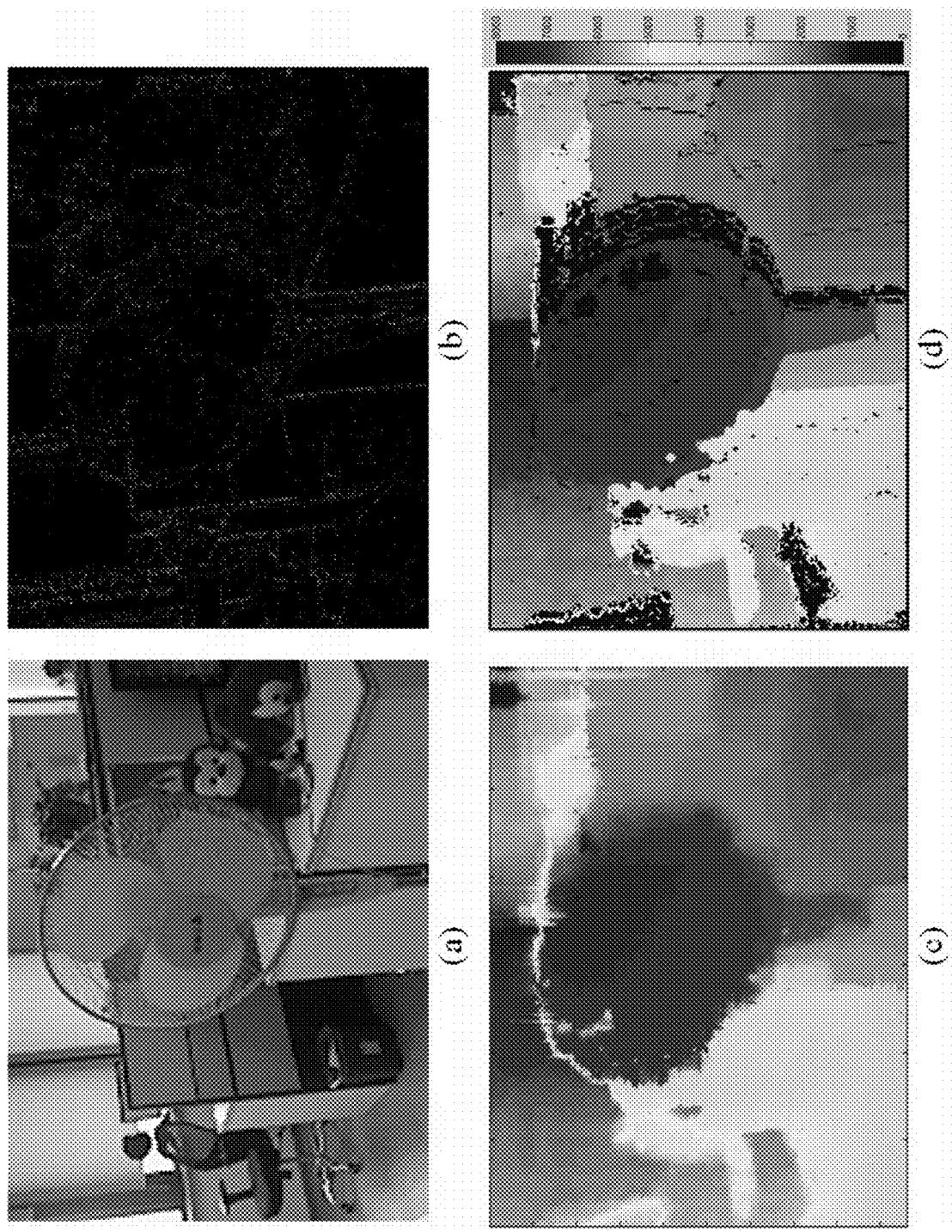
FIG. 4 is a schematic diagram exhibiting technical effects of a particular case according to the exemplary embodiments.

FIG. 4 is a schematic diagram exhibiting technical effects of a particular case according to the exemplary embodiments. The part (a) in FIG. 4 shows a previewed image of the original scene; the part (b) shows a frame image photographed and processed by a DVS; the part (c) shows a frame image processed by the image vision processing method provided by the exemplary embodiments; and, the part (d) shows a frame image processed by the related art. In comparison to the part (d), in the part (c), the noise points are reduced significantly, the contrast of pixel points within a same object contour range is smoother and more uniform, the transition between different object contours is smoother, and the whole image is more stereoscopic.

Figure 5:
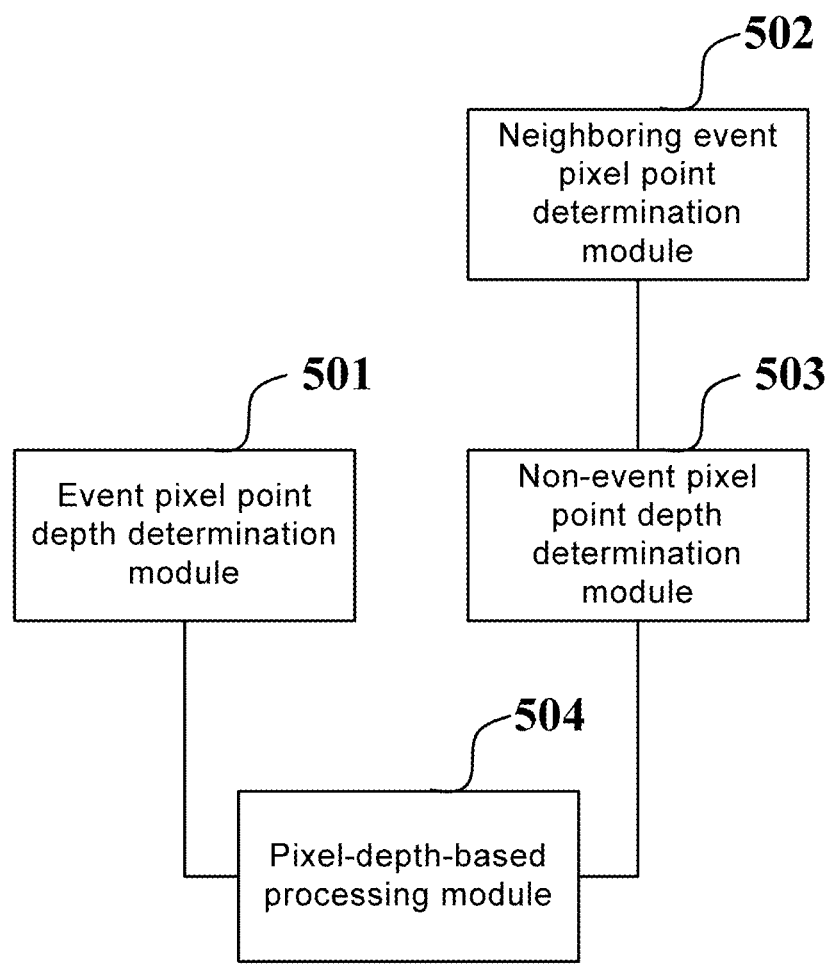
FIG. 5 is a schematic block diagram of an interior structure of an image vision processing device according to the exemplary embodiments.

Based on the image vision processing method, FIG. 5 shows a schematic block diagram of an interior structure of an image vision processing device according to the exemplary embodiments, comprising: an event pixel point depth determination module 501, a neighboring event pixel point determination module 502, a non-event pixel point depth determination module 503 and a pixel-depth-based processing module 504.

Wherein, the event pixel point depth determination module 501 is configured to determine parallax information and depth information of each event pixel point in a dual-camera frame image acquired by DVSs.

The neighboring event pixel point determination module 502 is configured to determine multiple neighboring event pixel points of each non-event pixel point in the dual-camera frame image.

The non-event pixel point depth determination module 503 is configured to determine, according to location information of each neighboring event pixel point of each non-event pixel point, depth information of this non-event pixel point.

The pixel-depth-based processing module 504 is configured to perform processing according to the depth information of each pixel point in the dual-camera frame image. Specifically, the pixel-depth-based processing module 504 is configured to perform processing according to the depth information of each event pixel point in the dual-camera frame image determined by the event pixel point depth determination module 501 and the depth information of each non-event pixel point in the dual-camera frame image determined by the non-event pixel point depth determination module 503.

Preferably, but not necessarily, the event pixel point depth determination module 501 is specifically configured to: determine, according to each pixel point in the dual-camera frame image and an event pixel point closest thereto, a feature value of this pixel point; determine, according to the feature value of each pixel point in the dual-camera frame image, a cost matrix of this pixel point; determine, according to the cost matrix of each event pixel point among the pixel points, parallax information of this event pixel point; and, determine, according to a focal length and a spacing of DVS cameras and the parallax information of each event pixel point, depth information of this event pixel point.

Preferably, but not necessarily, the event pixel point depth determination module 501 is specifically configured to: for each pixel point in each camera frame image of the dual-camera frame image, determine an event pixel point with an increased contrast closest to this event pixel point and an event pixel point with a reduced contrast closest to this event pixel point in this camera frame image; determine an Euclidean distance from this pixel point to the closest event pixel point with an increased contrast and an Euclidean distance from this pixel point to the closest event pixel point with a reduced contrast, as positive and negative Euclidean distances of this pixel point; and, determine a feature value of this pixel point according to the positive and negative Euclidean distances of this pixel point.

Preferably, but not necessarily, the event pixel point depth determination module 501 is specifically configured to: construct, according to event pixel points with an increased contrast and event pixel points with a reduced contrast in each camera frame image of the dual-camera frame image, positive polarity and negative polarity event images of this camera frame image, respectively; for each pixel point in each camera frame image, determine event pixel points closest to this pixel point in the positive polarity and negative polarity event images; and, determine Euclidean distances from this pixel point to the closest event pixel points in the positive polarity and negative polarity event images as positive and negative Euclidean distances of this pixel point.

Preferably, but not necessarily, the event pixel point depth determination module 501 is specifically configured to: for each pixel point in a camera frame image of the dual-camera frame image, determine a plurality of other pixel points within a neighborhood with same specified axis coordinates as this pixel point in the other camera frame image; determine, according to the feature values including differences between positive Euclidean distances and differences between negative Euclidean distances of this pixel point and the plurality of other pixel points, positive and negative feature matching costs of this pixel point; determine, according to differences in contrast polarity between this pixel point and the plurality of other pixel points, a polarity matching cost of this pixel point; and, determine, according to the positive and negative feature matching costs and the polarity matching cost of this pixel point, a cost matrix of this pixel point.

Preferably, but not necessarily, the event pixel point depth determination module 501 is specifically configured to: for each event pixel point in each camera frame image, minimize a cost value of the cost matrix of this event pixel point to obtain parallax information of this event pixel point based on the camera frame image; and, for one of two event pixel points with same specified axis coordinates, when the parallax information of this event pixel point based on one camera frame image is equal to the parallax information of the other event pixel point based on another camera frame image, use the parallax information based on one camera frame image as the parallax information of this event pixel point.

Preferably, but not necessarily, the neighboring event pixel point determination module 502 is specifically configured to: use each non-event pixel point in one camera frame image of the dual-camera frame image as an origin of coordinates, and respectively search two closest event pixel points along two side directions of one coordinate axis as two neighboring event pixel points of this non-event pixel point along the two side directions of the one coordinate axis; determine, according to the two neighboring event pixel points, a search range for neighboring event pixel points of this non-event pixel point along two side directions of another coordinate axis; search event pixel points within the search range to obtain a subset of neighboring event pixel points of this non-event pixel point in the two side directions of the another coordinate axis; and, determine, according to the subset of neighboring event pixel points in each side direction of each coordinate axis, a set of neighboring event pixel points of this non-event pixel point. Wherein, the one coordinate axis is perpendicular to the another coordinate axis.

Preferably, but not necessarily, the neighboring event pixel point determination module 502 is specifically configured to: determine, according to coordinates of the two neighboring event pixel points on the one coordinate axis, a range of coordinates on the one coordinate axis of event pixel points to be searched in two side directions of another coordinate axis, as the search range; search closest event pixel points along each side direction of the another coordinate axis, respectively; once an event pixel point is searched, determine whether coordinates of this event pixel point on the one coordinate axis are within the search range; and, if the coordinates of this event pixel point on the one coordinate axis are within the search range, use this event pixel point as a neighboring event pixel point in this direction of the another coordinate axis, so as to obtain a subset of neighboring event pixel points of this non-event pixel point in this direction of the another coordinate axis.

Preferably, but not necessarily, the neighboring event pixel point determination module 502 is specifically configured to: after combining subsets of neighboring event pixel points of this non-event pixel point in each side direction of each coordinate axis, remove repetitive neighboring event pixel points to obtain a set of neighboring event pixel points of this non-event pixel point.

Preferably, but not necessarily, the non-event pixel point depth determination module 503 is specifically configured to: determine, according to a sum of distances from neighboring event pixel points in the set of neighboring event pixel points of each non-event pixel point to an assumed plane, parameters for identifying the assumed plane; and, determine, according to the parameters for identifying the assumed plane and plane coordinates of each non-event pixel point, depth information of this non-event pixel point.

The implementations of the functions of the event pixel point depth determination module 501, the neighboring event pixel point determination module 502, the non-event pixel point depth determination module 503 and the pixel-depth-based processing module 504 can refer to the specific contents of the flow operations shown in FIG. 1, and will not be repeated here.

In the exemplary embodiments, the depth information of non-event pixel points occupying most regions of a frame image is determined according to the location information of multiple neighboring event pixel points. Since the non-event pixel points do not participate in the matching of pixel points, the problem in the related art that non-event pixel points are likely to be mismatched or unable to be matched is completely avoided. Even if it is difficult to distinguish between the non-event pixel points in terms of illumination intensity, contrast and texture or the non-event pixel points are occluded, in the exemplary embodiments, the depth information of the non-event pixel points can be accurately determined according to the location information of neighboring event pixel points, so that the accuracy of the depth information of the non-event pixel points occupying most regions of the frame image is improved. Consequently, the accuracy of the depth information of pixel points in the frame image is improved as a whole, and it is convenient to perform subsequent operations based on the depth information of the pixel points in the frame image. Moreover, in the exemplary embodiments, the operations of calculating the parallax information of the non-event pixel points are omitted, so that the efficiency is improved.

Furthermore, in the exemplary embodiments, for each pixel point in a frame image, even if there are factors such as illumination intensity, contrast, texture and/or occlusion of this pixel point, since the image features of this pixel point do not participate in the calculation of determining depth information, the Euclidean distance from this pixel point to the closest event pixel point with an increased contrast and the Euclidean distance from this pixel point to the closest event pixel point with a reduced contrast can be determined, so that the feature value of this pixel point, the cost matrix and the parallax information and depth information of event pixel points among the pixel points are determined successively. Consequently, the anti-interference performance of the process of determining the depth information of the event pixel points against the factors such as illumination intensity, contrast, texture and/or occlusion is enhanced greatly, the robustness of this process is increased, and it is advantageous to improve the accuracy of the depth information of the event pixel points. Moreover, the features of one pixel point contain not only the influence from the closest event pixel point with an increased contrast and also the influence from the closest event pixel point with a reduced contrast. In comparison to a case of performing no distinguishing between event pixel points with an increased contrast or a reduced contrast, the features of the pixel points are more accurate, so that the accuracy of the depth information of the event pixel points can be improved as a whole.

Further, in the exemplary embodiments, by using a non-event pixel point as an origin of coordinates, two closest event pixel points are respectively searched in two side directions of one coordinate axis as two neighboring event pixel points; then, a search range in two side directions of another coordinate axis is determined according to the two neighboring event pixel points; and, a subset of neighboring event pixel points in the two side directions of the another coordinate axis is searched from the search range. Similarly, a subset of neighboring event pixel points in each side direction of each coordinate axis is obtained, and the subsets are merged to form a set. As can be seen, the closest event pixel points rather than the farther event pixel points are searched as neighboring event pixel points. Therefore, on one hand, the search area can be reduced and the search efficiency can be improved. On the other hand, since there is a high probability for the closest event pixel points to be on a same plane as the non-event pixel points, the accuracy of determining the depth information of the non-event pixel points by using the three-dimensional location information of neighboring event pixel points can be improved.

It should be understood by those skilled in the art that the present invention involves devices for carrying out one or more of operations as described in the present invention. Those devices can be specially designed and manufactured as intended, or can comprise well known devices in a general-purpose computer. Those devices have computer programs stored therein, which are selectively activated or reconstructed. Such computer programs can be stored in device (such as computer) readable media or in any type of media suitable for storing electronic instructions and respectively coupled to a bus, the computer readable media comprise but are not limited to any type of disks (including floppy disks, hard disks, optical disks, CD-ROM and magneto optical disks), ROM (Read-Only Memory), RAM (Random Access Memory), EPROM (Erasable Programmable Read-Only Memory), EEPROM (Electrically Erasable Programmable Read-Only Memory), flash memories, magnetic cards or optical line cards. In other words, the readable media comprise any media storing or transmitting information in a device (for example, computer) readable form.

It should be understood by those skilled in the art that computer program instructions can be used to realize each block in structure diagrams and/or block diagrams and/or flowcharts as well as a combination of blocks in the structure diagrams and/or block diagrams and/or flowcharts. It should be understood by those skilled in the art that these computer program instructions can be provided to general purpose computers, special purpose computers or other processors of programmable data processing means to be implemented, so that solutions designated in a block or blocks of the structure diagrams and/or block diagrams and/or flow diagrams are executed by computers or other processors of programmable data processing means. For example, at least one processor implements solutions designated in a block or blocks of the structure diagrams and/or block diagrams and/or flow diagrams.

It should be understood by those skilled in the art that the steps, measures and solutions in the operations, methods and flows already discussed in the present invention can be alternated, changed, combined or deleted. Further, other steps, measures and solutions in the operations, methods and flows already discussed in the present invention can also be alternated, changed, rearranged, decomposed, combined or deleted. Further, the steps, measures and solutions of the prior art in the operations, methods and operations disclosed in the present invention can also be alternated, changed, rearranged, decomposed, combined or deleted.

The foregoing descriptions are merely some implementations of the present invention. It should be noted that, to a person of ordinary skill in the art, various improvements and modifications can be made without departing from the principle of the present invention, and these improvements and modifications shall be regarded as falling into the protection scope of the present invention.

What is claimed is:

1. An image vision processing method comprising:
    determining parallax information and depth information of event pixel points of a plurality of pixel points in a dual-camera frame image acquired by Dynamic Vision Sensors (DVSs), the plurality of pixel points comprising the event pixel points and non-event pixel points, wherein a first pixel of the event pixel points is associated with a first contrast value above a threshold, and wherein a second pixel of the non-event pixel points is associated with a second contrast value below the threshold, wherein the determining parallax information and depth information comprises:
        determining, according to the plurality of pixel points in the dual-camera frame image acquired by DVSs and event pixel points closest thereto, feature values of the plurality of pixel points, wherein a first feature value of the second pixel includes a Euclidean distance of the second pixel from the first pixel in a first image of the dual-camera frame image,
        determining, according to the feature values of the plurality of pixel points in the dual-camera frame image acquired by DVSs, cost matrices of the plurality of pixel points including event cost matrices of the event pixel points, wherein the cost matrices include a first matrix, and wherein the first matrix is based on a difference between the first feature value and a second feature value, and
    determining the parallax information of the event pixel points, according to the event cost matrices of the event pixel points;
    determining a plurality of multiple neighboring event pixel points of the non-event pixel points in the dual-camera frame image acquired by DVSs;
    determining depth information of the non-event pixel points, according to location information of the plurality of multiple neighboring event pixel points of the non-event pixel points; and
    performing processing according to the depth information of the non-event pixel points in the dual-camera frame image acquired by DVSs.

2. The image vision processing method according to claim 1, wherein the determining the parallax information and the depth information of the event pixel points of the plurality of pixel points in the dual-camera frame image acquired by DVSs comprises
    determining, according to a focal length and a spacing of DVS cameras and the parallax information of the event pixel points, the depth information of the event pixel points.

3. The image vision processing method according to claim 2, wherein the determining, according to the plurality of pixel points in the dual-camera frame image acquired by DVSs and the event pixel points closest thereto, the feature values of the plurality of pixel points comprises:

for one pixel point of the plurality of pixel points in one camera frame image of the dual-camera frame image acquired by DVSs, determining one first event pixel point with an increased contrast closest to the one pixel point and one second event pixel point with a reduced contrast closest to the one pixel point in the one camera frame image;

determining a first Euclidean distance from the one pixel point to the one first event pixel point and a second Euclidean distance from the one pixel point to the one second event pixel point, as a positive Euclidean distance and a negative Euclidean distance, respectively, of the one pixel point; and determining a feature value of the feature values, of the one pixel point according to the positive Euclidean distance and the negative Euclidean distance.

4. The image vision processing method according to claim 3, wherein, for the one pixel point of the plurality of pixel points in the one camera frame image of the dual-camera frame image acquired by DVSs, determining the one first event pixel point with the increased contrast closest to the one pixel point and the one second event pixel point with the reduced contrast closest to the one pixel point in the one camera frame image comprises:

determining other first event pixel points and other second event pixel points for other pixel points of the plurality of pixel points;

constructing, according to the one first event pixel point and the other first event pixel points, a positive polarity event image of the one camera frame image and constructing, according to the one second event pixel point and the other second event pixel points, a negative polarity event image of the one camera frame image; and for the one pixel point in the one camera frame image, determining the one first event pixel point that is closest to the one pixel point in the positive polarity event image and determining the one second event pixel point that is closest to the one pixel point in the negative polarity event image; and the determining the first Euclidean distance from the one pixel point to the one first event pixel point and the second Euclidean distance from the one pixel point to the one second event pixel point, as the positive Euclidean distance and the negative Euclidean distance, respectively, of the one pixel point comprises:

determining the positive Euclidean distance in the positive polarity event image and the negative Euclidean distance in the negative polarity event image.

5. The image vision processing method according to claim 3, wherein the determining the cost matrices of the plurality of pixel points, according to the feature values of the plurality of pixel points in the dual-camera frame image acquired by DVSs, comprises:

for the one pixel point in the one camera frame image of the dual-camera frame image acquired by DVSs, determining a plurality of other pixel points in an another camera frame image, within a neighborhood with same specified axis coordinates as the one pixel point;

determining, according to the feature values, a positive feature matching cost and a negative feature matching cost of the one pixel point;

determining, according to differences in contrast polarity between the one pixel point and the plurality of other pixel points, a polarity matching cost of the one pixel point; and determining, according to the positive feature matching cost, the negative feature matching cost, and the polarity matching cost of the one pixel point, a cost matrix of the one pixel point.

6. The image vision processing method according to claim 2, wherein the determining the parallax information of the event pixel points, according to the cost matrices of the event pixel points comprises:

for an event pixel point of the event pixel points in a camera frame image, minimizing a cost value of a cost matrix of the event pixel point to obtain parallax information of the event pixel point based on the camera frame image; and for one of two of the event pixel points with same specified axis coordinates, when the parallax information of one event pixel point based on one camera frame image is equal to the parallax information of another event pixel point based on another camera frame image, using the parallax information based on the one camera frame image as the parallax information of the one event pixel point.

7. The image vision processing method according to claim 1, wherein the determining of the plurality of multiple neighboring event pixel points of the non-event pixel points in the dual-camera frame image acquired by DVSs comprises:

using a non-event pixel point in one camera frame image of the dual-camera frame image acquired by DVSs as an origin of coordinates, and respectively searching for two closest event pixel points along two side directions of one coordinate axis as two neighboring event pixel points of the non-event pixel point;

determining, according to the two neighboring event pixel points, a search range for a subset of neighboring event pixel points of the non-event pixel point along two side directions of an another coordinate axis, wherein the one coordinate axis is perpendicular to the another coordinate axis;

searching for event pixel points within the search range to obtain the subset of neighboring event pixel points of the non-event pixel point along the two side directions of the another coordinate axis; and determining, according to the subset of neighboring event pixel points, a set of neighboring event pixel points of the non-event pixel point.

8. The image vision processing method according to claim 7, wherein the determining, according to the two neighboring event pixel points, the search range for neighboring event pixel points of the non-event pixel point along the two side directions of the another coordinate axis comprises:

determining, according to first coordinates of the two neighboring event pixel points on the one coordinate axis, a range of coordinates on the one coordinate axis of the event pixel points to be searched for along two side directions of another coordinate axis, as the search range; and the searching for event pixel points within the search range to obtain the subset of neighboring event pixel points of the non-event pixel point along the two side directions of the another coordinate axis comprises:

searching for closest event pixel points along each side direction of the another coordinate axis, respectively;

once an event pixel point is found, determining whether second coordinates of the event pixel point on the one coordinate axis are within the search range; and if the second coordinates of the event pixel point on the one coordinate axis are within the search range, using the event pixel point as a neighboring event pixel point in direction of the another coordinate axis, so as to obtain the subset of neighboring event pixel points of the non-event pixel point in the direction of the another coordinate axis.

9. The image vision processing method according to claim 7, wherein in the determining, according to the subset of neighboring event pixel points in side directions of coordinate axes, the set of neighboring event pixel points of the non-event pixel point comprises:

after combining subsets of neighboring event pixel points of the non-event pixel point in the side directions of the coordinate axes, removing repetitive neighboring event pixel points to obtain the set of neighboring event pixel points of the non-event pixel point.

10. The image vision processing method according to claim 1, wherein the determining the depth information of the non-event pixel points, according to the location information of the plurality of multiple neighboring event pixel points of the non-event pixel points comprises:

determining parameters for identifying a plane, according to a sum of distances from each neighboring event pixel points in a set of neighboring event pixel points of a non-event pixel point to the plane; and determining, according to the parameters for identifying the plane and plane coordinates of a non-event pixel point, depth information of the non-event pixel point.

11. An image vision processing device comprising:

at least one processor configured to implement:

an event pixel point depth determination module configured to determine parallax information and depth information of event pixel points in a dual-camera frame image acquired by DVSs;

a neighboring event pixel point determination module configured to determine multiple neighboring event pixel points of non-event pixel points in the dual-camera frame image acquired by DVSs;

a non-event pixel point depth determination module configured to:

determine, according to location information of the multiple neighboring event pixel points, depth information of the non-event pixel points, wherein a first pixel of the event pixel points is associated with a first contrast value above a threshold, and wherein a second pixel of the non-event pixel points is associated with a second contrast value below the threshold, determine, according to the plurality of pixel points in the dual-camera frame image acquired by DVSs and event pixel points closest thereto, feature values of the plurality of pixel points, wherein a first feature value of the second pixel includes a Euclidean distance of the second pixel from the first pixel in a first image of the dual-camera frame image, determine, according to the feature values of the plurality of pixel points in the dual-camera frame image acquired by DVSs, cost matrices of the plurality of pixel points including event cost matrices of the event pixel points, wherein the cost matrices include a first matrix, and wherein the first matrix is based on a difference between the first feature value and a second feature value, and determine the parallax information of the event pixel points, according to the event cost matrices of the event pixel points; and a pixel-depth-based processing module configured to perform processing according to the depth information of pixel points in the dual-camera frame image acquired by DVSs.

12. An image vision processing equipment comprising:

Dynamic Vision Sensor (DVS) cameras configured to acquire a dual-camera frame image by photographing; and the image vision processing device according to claim 11, configured to perform vision processing on the dual-camera frame image to obtain the depth information of the pixel points in the dual-camera frame image, and perform another processing.

13. The image vision processing method of claim 2, wherein the second feature value is associated with a second image of the dual-camera frame image and wherein the second feature value includes a third Euclidean distance of a third pixel from the first pixel, wherein the third pixel is associated with coordinates offset by a parallax parameter d from coordinates of the second pixel.

* * * * *